Figure 1:
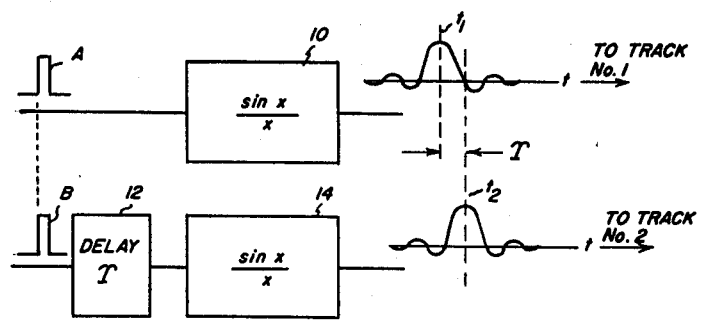

United States Patent [19]

Lemke

[11] 4,388,656
[45] Jun. 14, 1983

[54] MULTITRACK RECORDING WITH MINIMAL INTERMODULATION

[75] Inventor: James U. Lemke, Del Mar, Calif.

[73] Assignee: Eastman Kodak Company, Rochester, N.Y.

[21] Appl. No.: 193,774

[22] Filed: Oct. 3, 1980

[51] Int. Cl.$^3$ .................. H04N 5/785; G11B 5/00
[52] U.S. Cl. .................................... 360/33.1; 360/22
[58] Field of Search .............. 360/22, 25, 32, 33, 360/45, 55, 23, 33.1; 358/127, 8, 4, 315, 327, 330, 310, 335, 340

[56] References Cited

U.S. PATENT DOCUMENTS

| | | | |
|---|---|---|---|
| 2,517,808 | 8/1950 | Sziklai | 360/23 |
| 2,698,875 | 1/1955 | Greenwood | 360/23 |
| 2,816,162 | 12/1957 | Johnson | 360/23 X |
| 2,881,255 | 4/1959 | Hall | 360/23 |
| 2,892,886 | 6/1959 | Johnson | 360/23 |
| 2,952,745 | 9/1960 | Walker | 360/23 |
| 2,958,735 | 11/1960 | Maier et al. | 360/23 |
| 3,188,648 | 6/1965 | Cecil | 360/23 |
| 3,192,515 | 6/1965 | Pingry | 360/23 |
| 3,409,900 | 11/1968 | Markakis | 360/25 |
| 3,412,214 | 11/1968 | Gabor | 360/22 |
| 3,553,080 | 1/1971 | Hammond | 360/22 |
| 3,806,640 | 4/1974 | Furukawa | 360/23 |
| 3,809,805 | 5/1974 | Kasprzak | 360/23 X |
| 3,975,764 | 8/1976 | Kobayashi et al. | 360/23 |
| 4,000,513 | 12/1976 | Precourt | 360/45 |
| 4,022,986 | 5/1977 | Teer et al. | 360/44 |
| 4,181,822 | 1/1980 | Workman | 360/23 X |
| 4,205,352 | 5/1980 | Tomada | 360/45 |
| 4,222,078 | 9/1980 | Bock | 360/23 X |

FOREIGN PATENT DOCUMENTS 52-42709  4/1977  Japan ........................ 360/33

OTHER PUBLICATIONS

Mullin, "Video Magnetic Tape Recorder", Tele-Tech & Electronic Ind., May 1954: pp. 77, 127–129.

Primary Examiner—Bernard Konick
Assistant Examiner—Donald McElheny, Jr.
Attorney, Agent, or Firm—Robert F. Cody

[57] ABSTRACT

Whether for the recording of parallel or serially occurring information, the general concept of the invention is to record sample (or bit) data in the form of damped ringing signals (e.g. of the form (sin x)/x) and to provide relative delay between the recordings of adjacent tracks so that the principal peak of one recorded signal falls on a zero crossing of another, and vice versa. Since the peaks of no two adjacent signals occur—in the case, for example, of magnetic tape—at the same longitudinal position of the tape, isolation between the signals—as recorded on the tape—is effected. By suitably sampling the signals on the tape during playback, the original signal may be reproduced.

31 Claims, 6 Drawing Figures

MULTITRACK RECORDING WITH MINIMAL INTERMODULATION

BACKGROUND OF THE INVENTION

1. Field of the Invention

This invention relates in general to apparatus for the recording and playback of signals, and in particular to recording and playback apparatus in which intermodulation between signals in adjacently recorded tracks is minimized and/or precluded.

2. Description Relative to the Prior Art

There are many recording applications in which signals are recorded in side-by-side tracks of a recording medium. The respective bits of a digital word, for example, are often recorded in parallel, side-by-side, tracks of a magnetic tape or disc. In multitrack longitudinal magnetic recording of analog signals, recordings are also made in side-by-side tracks. To assure against crosstalk between signals recorded in a plurality of adjacent tracks, it is usual to employ unrecorded regions, i.e. guardbands, between such tracks. This is, naturally, wasteful of the recording surface and, in applications involving a large number of guardband-separated tracks, the recording medium that is required may be so wide as to render the using hardware non-competitive in a commercial sense. There is, therefore, a strong desire to obviate the use of guardbands.

As is known, there is, also, a strong trend toward the recording of video signals by use of a transducer such as a multitrack scanning magnetic head, whereby the requisite recording bandwidth may be reduced in proportion to the number of tracks employed. (A lessened bandwidth means that low recording tape speed and simplified hardware may be utilized for the recording operation.) When video recording with a multitrack scanning head, each video line is, for example, broken into the same number of picture elements (hereinafter called pixels) and common pixels of the respective video lines are recorded in the same track by the same core of the multitrack head. Thus, the number one pixel of all video lines 1 through 525 (assuming a 525 line video frame) is, for example, recorded in track number one by core number one; the number two pixel of all video lines 1 through 525 is recorded in track number two by core number two; etc. Assuming there are, say, 256 pixels per video line, there are, in the above-described recording system, 255 guardbands that it would be desirable to do without.

Signals corresponding to the pixels of a video frame (video frames occur, typically, at 30 per sec.) are produced, usually, by sampling the corresponding video signal at the pixel rate, i.e. at 256×525 per thirtieth of a second, or at about $4 \times 10^6$ per second. Such sampling, as is known, per Nyquist, will provide unaliased spatial frequencies in the video display to about 2 MHz.

In a signal sampling system, it is well known to convert signal samples (which are generally rectangularly shaped impulses) to (sin x)/x (or similar) waveforms and to provide that successive signal samples in a given signal channel temporally occur at the "zero crossings" of the waveforms of other signal waveforms, thereby to avoid intersymbol interference. U.S. Pat. No. 2,952,745, as well as Transmission Systems For Communications, Bell Telephone Laboratories, Inc., 1964, and other literature, disclose such practice. Whereas the technique of preshaping pulses has been employed to avoid interference between pulses in a single channel, a commonly employed technique for providing "guardbandless" track-to-track isolation between adjacent tracks has been by skewing the signal information of adjacent tracks with respect to each other. Guardbandless Sony Betamax video recordings, for example, resemble herringbones, with each half of any given "herringbone" constituting a discrete video track. Such a technique provides good, but not total, isolation between the signals of adjacent tracks; and any skewing of the tape during playback will cause a decrease of wanted signals at the expense of unwanted (adjacent) signals.

Recordings such as are made with Sony Betamax recorders are serial in nature, i.e. first one track is recorded; then another; and so on. As noted above, however, there are instances when a plurality of bits, as in a digital word, simultaneously appear for recording in respective tracks. To effect core-to-core gap skewing in a multitrack head to provide track-to-track isolation in the manner of the Betamax machine would be nigh impossible, since no multitrack head with alternatingly skewed core gaps is known. Thus, a technique for providing track-to-track isolation, regardless of whether the signal information occurs serially or in parallel, is desirable.

Aside from the matter of tape track-to-track isolation—which manifests itself as a playback phenomenon—it is also desirable to provide isolation between signals processed through a magnetic record head. It is for this reason that shields are usually placed between the cores of a multitrack magnetic head. Without such shields, flux in one core can spread to an adjacent core and, in bridging the gap of the adjacent core, effect unwanted recording in the track that corresponds to the adjacent core.

SUMMARY OF THE INVENTION

By means of the invention, not only are shieldless multitrack heads made practical, but track-to-track isolation without use of guardbands (regardless of whether the information to be recorded appears serially or in parellel) is provided.

Whether for the recording of parallel or serially occurring information, the general concept of the invention is to record sample (or bit) data in the form of damped ringing signals (e.g. of the form (sin x)/x and to provide relative delay between the recordings of adjacent tracks so that the principal peak of one recorded signal falls on a zero crossing of another, and vice versa. In the case of serially occurring signals, e.g. the multitrack recording of video pixel samples, the relative delay may be provided as part of the track-to-track switching that occurs in the head; in the case of parallel occurring signals, e.g. as in the recording of simultaneously occurring bits of a digital word, signals corresponding to alternate bits are applied to delay devices prior to recording and, after playback thereof, those signals which were not subjected to pre-recording delays are appropriately delayed to bring them back in step with the previously delayed signals. Since the peaks of no two adjacent signals occur—in the case, for example, of magnetic tape—at the same longitudinal position of the tape, isolation between the signals—as recorded on the tape—is effected. By suitably sampling the signals on the tape during playback, the original signals may be reproduced.

So long as (sin x)/x (or similar) signals occurring in adjacent tracks have their principal peaks temporally separated by multiples of the bit or sampling times, track-to-track isolation will be effected; and, so long as such principal peaks are temporally separated by two or more multiples of the bit or sampling times, signal-to-signal isolation within any given track (channel) will be effected as well.

Figure 4:
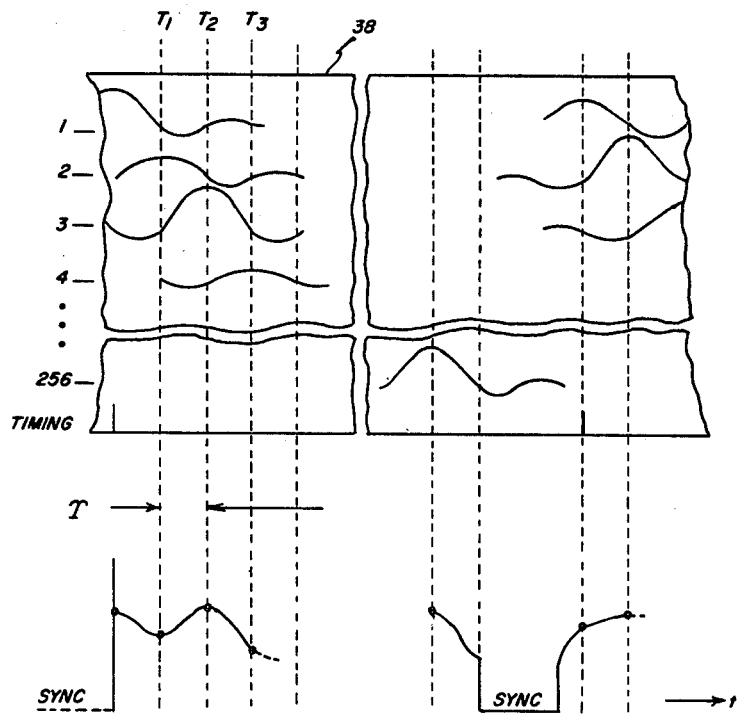
Figure 2:
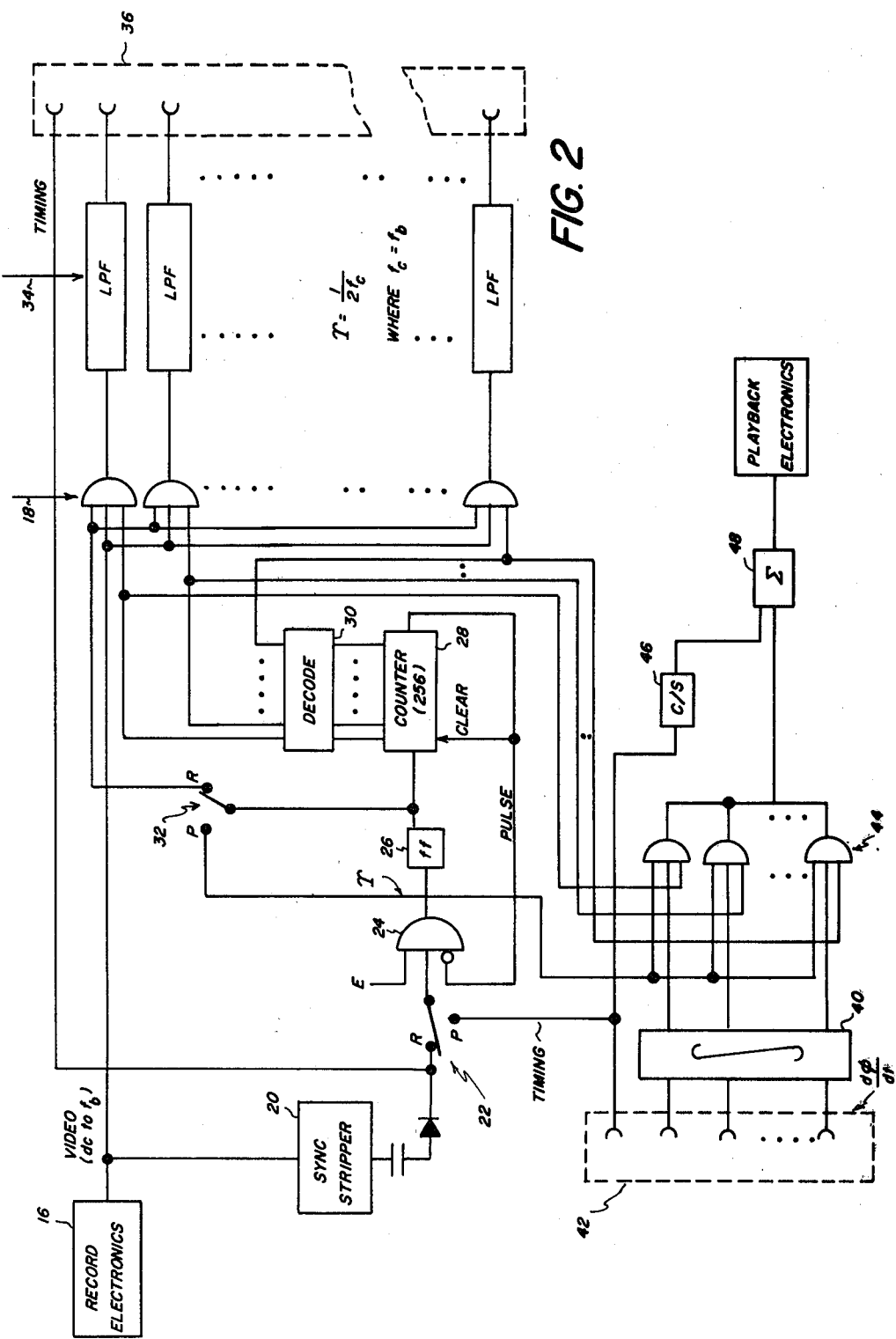
Figure 3:
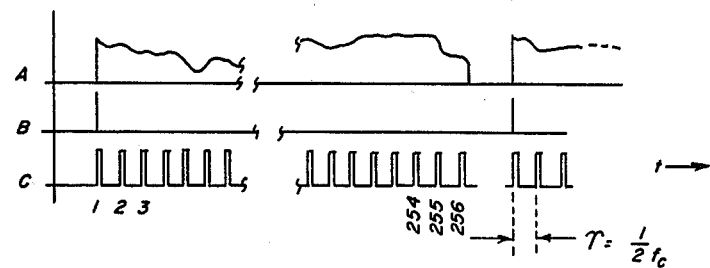
Figure 6:
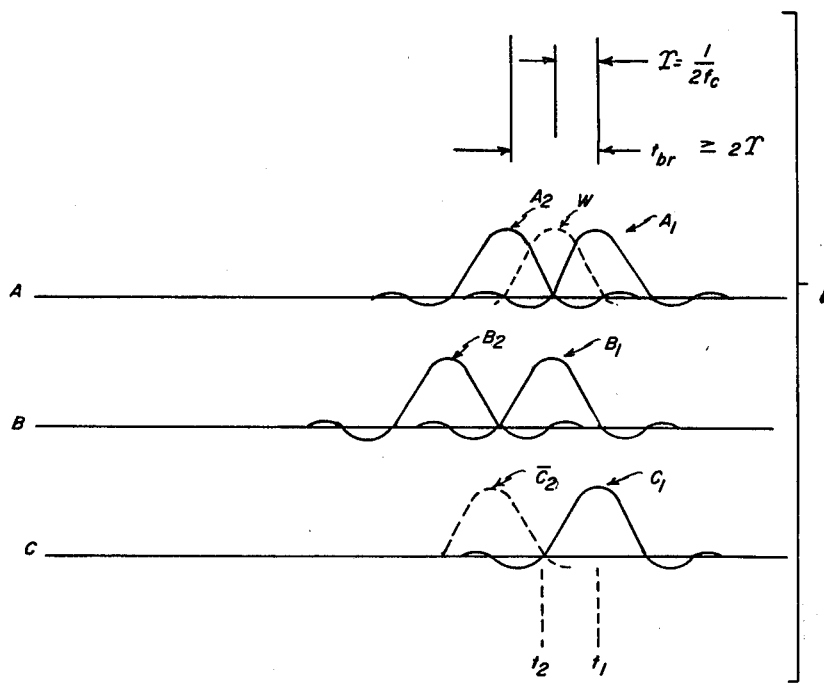
Figure 5:
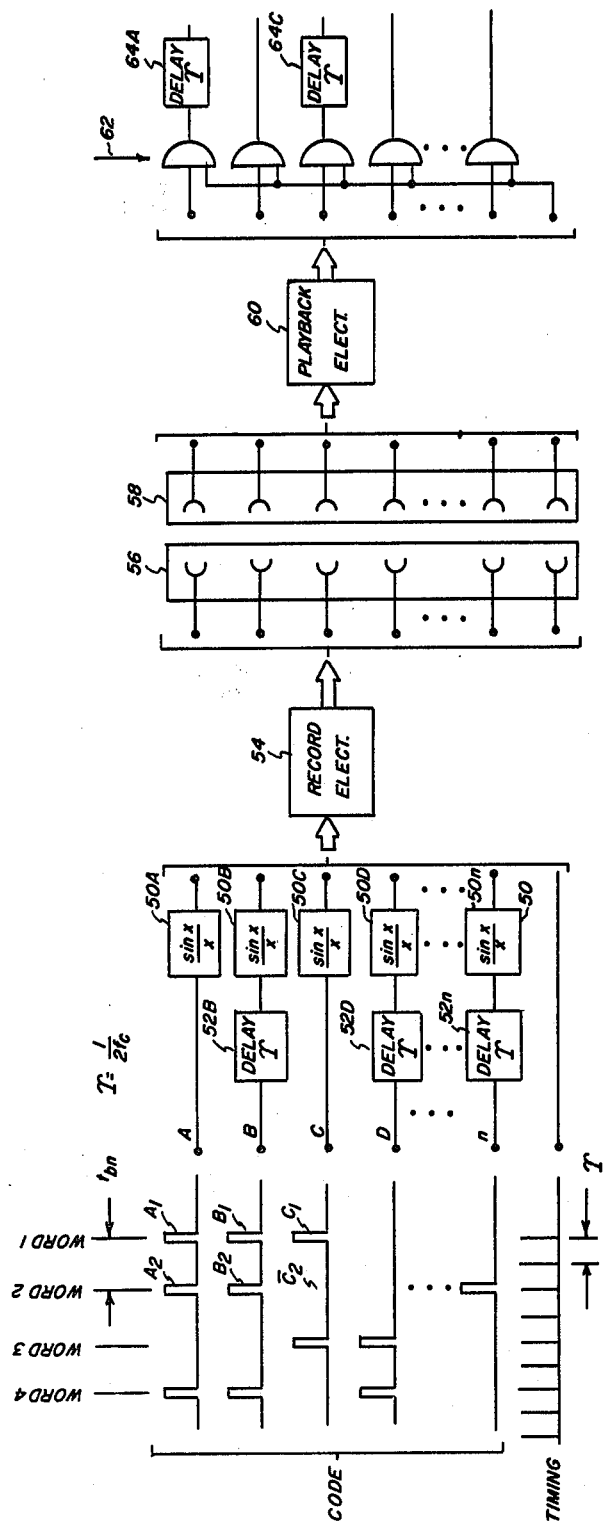

That this is so will be appreciated better below where the invention is described with reference to figures, of which FIG. 1 is a schematic block diagram useful in describing the general concept(s) of the invention, FIG. 2 is a block diagram of a video recorder for practicing one form of the invention, FIG. 3 is a set of waveforms useful in describing the apparatus of FIG. 2, FIG. 4 is a diagramatic showing of a recording as made by the apparatus of FIG. 2, FIG. 5 is a block diagram of another embodiment of the invention, and FIG. 6 shows a set of waveforms useful in describing the apparatus of FIG. 5.

Before discussing preferred embodiments of the invention, it is considered appropriate to provide an overview of the concept(s) of the invention. With this in mind, therefore, reference should be had to FIG. 1 which shows a pair of information channels, corresponding to tracks 1 and 2 of some recording medium. An impulse A, such as a sample of video information in the channel corresponding to track 1, is applied to a signal modifying device 10. The signal modifying device 10 is adapted to transform the impulse A which it receives into a damped ringing signal having a given period $\tau$ between successive zero crossings. To this end, a low pass filter, which inherently transforms a signal input pulse into a waveform of the form (sin x)/x, has been found to be quite useful. A second impulse B, such as a different sample of video information in the channel corresponding to track 2, is applied, after a suitable delay (12), to a second signal modifying device 14 adapted to provide a damped ringing signal having a "swing" period $\tau$ that equals the time of the aforenoted signal delay (12). The signal modifying device 14 may also be a low pass filter.

To be noted in FIG. 1 is that the ringing signals exiting the signal modifying devices of the two channels are so displaced that the principal peak of the track 1 signal occurs at a zero crossing of the track 2 signal, and vice versa. If, in playback, the signal in the first channel is sampled at periods $\tau$ (with appropriate phase synchronization), a single sample signal at time $t_1$ will be produced in the first channel; and if the signal in the second channel is similarly sampled, a second single sample signal will be produced at time $t_2$ in the second channel.

As will be appreciated, since the information channels of FIG. 1 are associated with a pair of record cores of a multitrack magnetic head and two tracks of a cooperating magnetic recording medium, peak flux in the track of channel 1 at time $t_1$ will not, "as recorded", adversely affect signal flux in the track of channel 2, and vice versa. The need, therefore, for a magnetic shield between the record cores, or for a guardband between the tracks, is obviated, or at least lessened.

(Although the delay (12) in the second channel of FIG. 1 is depicted at the input side of the signal modifying device 14, this is a somewhat arbitrary location and, in fact, the delay may be provided in any convenient way on the record side of the channel. Also, while the invention as discussed above, and as will be further discussed below, is depicted in the environment of magnetic recording, such is not an essential environment for the invention. Indeed, the invention may be practiced in connection with, for example, optical and thermal recorders.)

As is known, in the case of a low pass filter, the swing period $\tau$ associated therewith equals $1/(2\ f_c)$, where $f_c$ is the cutoff frequency of the filter. Since, to meet the Nyquist criterion, the video band (from dc to a frequency of $f_b$) to be sampled must be sampled at a frequency $f_s$ equaling at least $2\ f_b$, it will be appreciated that if the low pass filter has a cutoff frequency of $f_c = f_b$, then both the Nyquist criterion and the need for a swing period $\tau = 1/f_s$, per the invention, will be satisfied.

With the above as background, therefore, reference should now be had to FIG. 2 (and to the accompanying waveforms of FIGS. 3, 4) showing a multitrack video recorder incorporating the invention:

As a baseband video signal such as the signal A of FIG. 3 exits record electronics 16, it is applied simultaneously to a bank of AND gates 18 and to a sync stripper 20. The source of the baseband signal (electronics 16) forms no part of the invention; and sync strippers are well known in the art. In this embodiment of the invention, a gating pulse corresponding to the trailing edge of the sync pulse (B, FIG. 3) is applied via a record (R)/play (P) switch 22 to a NAND gate 24 cooperative with a free-running flip-flop circuit 26. The NAND gate 24, in response to its received gating pulse, applies power (E) to the flip-flop circuit 26 which, in turn, runs to produce a stream of relatively narrow pulses (C, FIG. 3) until power is removed from the flip-flop circuit 26. The period occurring between successive pulses of the flip-flop circuit 26 corresponds to the time $\tau$.

A counter 28, which may be an 8-bit binary counter, receives the output pulses of the flip-flop circuit 26 and counts to the binary equivalent of 256, at which count the counter 28 clears, and the NAND gate 24 is inhibited. Thus, the flip-flop circuit 26 is disabled by the removal of power (E) during the sync periods. Of course, in response to the next occurring sync pulse (trailing edge), power E is again applied to the flip-flop circuit 26, which again causes the counter 28 to count to the binary equivalent of 256, and so on.

The binary count of the counter 28 is applied to a decoding matrix 30 which, in turn, successively arms the AND gates 18 to which the video signal is applied in parallel. Aside from being applied to the counter 28, the pulse output of the flip-flop circuit 26 is applied via a record/play switch 32 (the switches 22, 32 may be ganged) to the AND gates 18, whereby successive samples (256 in number) are taken of the baseband video signal applied by the electronics 16 to the AND gates 18.

The successive video samples, which occur at sampling time periods $\tau$, are applied in succession to low pass filters 34 within a bank of filters. The low pass filters are each designed to have a cutoff frequency $f_c$ such that $f_c$ equals $1/(2\tau)$, $f_c$ equaling the highest frequency $f_b$ within the baseband signal to be recorded. The output of each low pass filter, therefore, is a signal waveform of the form (sin x)/x, and the main peak of each such waveform is temporally displaced from its neighboring main peak by a period $\tau$. (It will be appreciated that since the period associated with the filter cutoff frequency $f_c$ is $\tau_c$, i.e. $\tau_c = 2\tau$, and since $f_c$ equals $f_b$, the sampling frequency $f_s$ corresponding to the period $\tau$ satisfies the Nyquist criterion, i.e. $f_s = 2\ f_b = 2\ f_c$.)

The succesively occurring (sin x)/x signals are applied (along with timing signals produced at the output of the sync stripper 20) to the discrete cores of a multitrack magnetic head 36 (without shields between the cores), whence they are recorded in respective tracks of a magnetic medium such as a disc or tape ... there being no guardbands between the tracks. See FIG. 4 which symbolically shows the successive (sin x)/x samples recorded in 256 guardbandless tracks of a recording medium 38. Note should be taken that the principal peak of the (sin x)/x signal in each track occurs at the zero crossings of the (sin x)/x signals in every other track. Thus, if during playback, the (sin x)/x signal in track 1 is sampled at a time that corresponds to $T_1$, the signal in track 2 at a time corresponding to $T_2$, the signal in track 3 at a time corresponding to $T_3$, etc., the original baseband video signal may be restructured from such samples. To this end, therefore, reference should again be had to the circuit of FIG. 3, the switches 22, 32 being thrown to their "play" positions.

As is known, a conventional playback head has a differentiating effect in that it responds to rates of change of recorded flux. Such being the case, the form of the (sin x)/x signals, as played back, will be different from the signal form as recorded. To compensate for this undesired distortion, a complementary integrating device 40 is employed to receive the differentiated (sin x)/x signal outputs of the cores of a playback head 42 and to restore those differentiated signals to their (sin x)/x form. (Of course the same head may, in some applications, be used for both record and playback.) The (sin x)/x signals appearing at the output of the integrator 40 are applied to respective AND gates 44. The AND gates 44, like the AND gates 18, are successively armed by the output of the decoding matrix 30 which deciphers the count of the counter 28. In all respects, the circuit components 24, 26, 28, 30 function as they did when recording signals but, during playback, rather than be triggered into operation by the output of the sync stripper 20, they are triggered into operation by the recorded timing signals. At proper synchronized times, and at periods $\tau$, the played back (sin x)/x signals appearing at the AND gates 44 are sampled by the pulse output of the flip-flop circuit 26, thereby to provide signal pulses having amplitudes corresponding to the "dots" of the lower figure of FIG. 4. Thus, the video baseband signal which was recorded is reproduced without crosstalk between the signals in adjacent channels. Composite sync (46) is inserted (summing circuit 48) into such baseband signal at proper times under control of the recorded timing signals.

Aside from being applicable to the recording of analog signals such as video signals, the invention as noted above may be employed to record information temporally occurring in parallel, as often occurs in the processing of digital words. Consider, therefore, the n bit encoded words of FIG. 5 applied to a plurality of record channels A to n respective of the bits in such words. Each such channel includes a substantially identical means, $50_{A,B}$... for transforming its received bit pulses into waveforms of the damped ringing type. Again, such transformations may be made by low pass filters which convert impulses to signals of the form (sin x)/x. To be noted is that every other channel includes a delay device $52_{B,D}$... for delaying the signals of those channels for a period $\tau$ corresponding to the time between successive zero crossings of the damped ringing signals, $\tau$ being equal to $1/(2 f_c)$, where $f_c$ is the cutoff frequency of the filters 50. The outputs of the filters 50 are applied, via signal conditioning record electronics 54, in parallel to a multitrack magnetic head 56 for simultaneous recording of such outputs on a magnetic recording medium (not shown).

Reference should now be had to FIG. 6 which shows (sin x)/x signal waveforms corresponding to the first three bits, $A_1B_1C_1$ and $A_2B_2\overline{C}_2$, of the first two digital words produced by the filters $50_{A,B,C}$ of FIG. 5. Because of the action of the delay device $52_B$, crosstalk between the peak amplitude of the (sin x)/x waveforms of the A and B channels, and between the waveforms in the B and C channels, is obviated, regardless of whether the (sin x)/x signals are within the head 56 or as recorded. This is because the peak signals of the A and C channels occur at a time $t_1$, whereas the peak signal of the B channel occurs at a time $t_2$, where $t_2$ minus $t_1$ equals $\tau$. To assure against interference between (sin x)/x waveforms corresponding to bits of successive words within any given channel and delayed (sin x)/x waveforms in other channels, the time between successive bits within the channels must equal two or more multiples of the time $\tau$. This may be appreciated from FIG. 6 which shows the period $t_{br}$, corresponding to the period of the bit rate of the bits in any given channel, as being twice the zero crossing period $\tau$ associated with the delay devices 52. Were the period associated with the bit rate to be less than $2\tau$, say equal to $\tau$, a peak signal could occur (see the dashed waveform W of FIG. 6) in the A channel at the same time a peak signal occurs in the B channel, attendantly producing intermodulation between such signals. By correct choice of filters 52, such that $f_c$ equals both $1/(2\tau)$ and $1/t_{br}$ (or reciprocals of multiples of $t_{br}$), intermodulation between the peaks of adjacent differently timed signals is precluded.

In playback, the waveform signals recorded by means of the record head 56 are reproduced by a head 58 (which may be the record head 56 operating in a reproduce mode). The reproduced waveform signals are processed by signal conditioning playback electronics 60, which may include a signal integrating device to compensate for the differentiating action of the reproduce head, as was described above in connection with FIG. 3. Thus, properly formed (sin x)/x waveform signals are applied to AND gates 62, and such waveform signals are sampled at periods $\tau$ by means of timing signals which were recorded along with the information bits. Since alternating bits of the digital words are delayed for periods $\tau$ at the time of recording, delay devices $64_{A,C}$... in alternating channels are provided on the playback side of the recorder of FIG. 5, thereby to bring the bits of each word back into the same time frame.

Whether in connection with the recording and playback of serially occurring samples of analog signals as discussed in relation to FIGS. 2-4, or in relation to the recording and playback of simultaneously occurring bits (as in a digital word, the bits of which occur in parallel) per the above discussion relative to FIGS. 5, 6, the invention has been demonstrated to provide such signal isolation that the need for recording medium guardbands and/or shields between, for example, the cores of a recording magnetic head is obviated, or at least lessened.

The invention has been described in detail with particular reference to preferred embodiments thereof, but it will be understood that variations and modifications can be effected within the spirit and scope of the invention.

What is claimed is:

1. Multitrack recording apparatus for recording the information content of impulse signals comprising
   (a) means for receiving a first impulse signal for transforming said first impulse signal into a damped ringing signal having a signal waveform having a period $\tau$ between successive zero crossings thereof,
   (b) means for receiving a second impulse signal for transforming said second impulse signal into a damped ringing signal having a signal waveform having a period $\tau$ between successive zero crossings thereof, and
   (c) multitrack recording means adapted to receive the transformed first and second impulse signals for so recording said transformed signals in respective tracks of a recording medium that the principal peaks of said two transformed signals occur at spaced apart locations of said medium, which locations are such that the principal peak of one transformed signal occurs proximate a zero crossing of the other, and vice versa, thereby minimizing intermodulation between said recorded signals.

2. The recording apparatus of claim 1 wherein both said means for transforming signals are adapted to produce signals of the form $(\sin x)/x$.

3. The apparatus of claim 2 wherein both said means for transforming signals are low pass filters.

4. The apparatus of claim 1 wherein said multitrack recording means is a multitrack magnetic head in which there is no track-to-track magnetic shielding within said head.

5. Multitrack recording apparatus comprising
   (a) a multitrack head having a plurality of recording transducers,
   (b) a source of impulse signals,
   (c) means adapted to receive said impulse signals for modifying said impulse signals into respective damped ringing signals having the same period of oscillation as each other, said means for modifying said impulse signals being adapted to apply said modified signals to respective recording transducers of said multitrack head for purpose of recording said modified signals, and
   (d) means for effecting delays between the recording of said modified signals such that adjacently recorded signals have their principal peaks at the zero crossings of proximately recorded signals.

6. The apparatus of claim 5 wherein the delays effected by said means for effecting delays are integer multiples of said period of oscillation.

7. The apparatus of claim 6 wherein said means for effecting delays is further adapted to provide a delay between successive signals applied to each of said recording transducers of two or more integer multiples of said period of oscillation.

8. The apparatus of claim 6 wherein said means for modifying impulse signals is means for modifying such signals into signals having $(\sin x)/x$ waveforms.

9. The apparatus of claim 6 wherein said multitrack head is a magnetic head in which there is no magnetic shielding between the transducers thereof.

10. The apparatus of claim 5 wherein said multitrack head is a magnetic head in which there is no magnetic shielding between the transducers thereof.

11. The apparatus of claim 5 including multitrack playback apparatus comprising means for sampling recordings made by means of said recording apparatus, said means for sampling being adapted to sample recorded signals at their respective principal peaks, thereby to produce signals corresponding to said impulse signals.

12. The apparatus of claim 11 wherein said means for sampling includes a multitrack magnetic head disposed to reproduce said recorded multitrack signals of said damped ringing type, said means for sampling further including gate means for successively sampling said reproduced signals at their respective principal peaks.

13. For use in producing signals corresponding to the information-containing principal peaks of damped ringing signals respectively recorded in a plurality of tracks of a recording medium in such a way that the principal peak of each such signal is situated in said medium at the zero crossings of its adjacent signals, apparatus comprising
   (a) a multitrack playback transducer adapted to reproduce the discrete signals recorded in the tracks of said recording medium,
   (b) means for sampling the reproduced signals at periods which
      (1) correspond to the periods of oscillation of said damped ringing signals and
      (2) occur at the principal peaks thereof, and
   (c) means for converting the signals produced by said subject sampling into a signal that is the analog thereof.

14. Apparatus for recording an analog signal comprising
   (a) means for sampling said analog signal at evenly spaced times to produce a series of impulse signals,
   (b) means adapted to receive said impulse signals for converting said impulse signals to signals having damped ringing waveforms having periods of oscillation which correspond to said sampling times,
   (c) multitrack transducer means for recording received signals in a recording medium, and
   (d) means for selectively applying to said transducer means said signals having damped ringing waveforms so that such signals reside in respective tracks of said medium.

15. The apparatus of claim 14 wherein said signal converting means is of a type that converts impulse signals into signals having the form $(\sin x)/x$.

16. The apparatus of claim 14 wherein said signal converting means is low pass filter means having a cutoff frequency equal to the frequency at which said means for sampling samples said analog signal.

17. The apparatus of claim 14 wherein said transducer means is a multitrack magnetic head devoid of magnetic shields between its discrete transducers.

18. The apparatus of claim 14 wherein said means for sampling is adapted to sample said analog signal such that the displacement between successive recordings in any given recording medium track corresponds to two or more integer multiples of said periods of oscillation.

19. Video recording apparatus comprising
   (a) a multitrack magnetic head having a succession of discrete signal-recording transducers,
   (b) means for receiving a video signal for sampling said video signal at a frequency that is at least twice the highest frequency in the video signal bandwidth, thereby to produce a series of pulsed analog signals,
   (c) means for converting said pulsed analog signals to respective damped ringing signals having periods of oscillation corresponding to the period associated with said sampling frequency, and (d) means for applying said damped ringing signals successively to the discrete transducers of said magnetic head, whereby when said magnetic head cooperates with a magnetic recording medium, damped ringing signals are recorded in such medium in such a way that the principal peak of any one signal occurs proximate the zero crossings of its neighboring recorded signals.

20. Apparatus of claim 19 wherein
(a) said video signal is comprised of line signals each of which is comprised of a succession of picture element signals,
(b) said multitrack magnetic head is a scanning magnetic head having the same number of discrete transducers as these are picture element signals in a line signal, and
(c) said means for converting said pulsed analog signals to respective damped ringing signals is means for converting impulse signals to signals having the form $(\sin x)/x$.

21. The apparatus of claim 20 wherein said multitrack magnetic head is one without magnetic shields between its transducers.

22. The apparatus of claim 19 wherein said means for converting said pulsed analog signals to damped ringing signals is low pass filter means having a cutoff frequency approximately equal to the bandwidth of said video signal.

23. The apparatus of claim 19 wherein the sampling is such that the period between successive damped ringing signals applied to any given transducer is at least two or more integer multiples of the sampling period.

24. The apparatus of claim 23 wherein said means for converting said pulsed analog signals to respective damped ringing signals is means for converting impulse signals to signals having the form $(\sin x)/x$.

25. The apparatus of claim 19 including playback apparatus comprising
(a) a multitrack playback magnetic head responsive to the rate of change of recorded signal flux,
(b) means cooperative with said playback magnetic head for integrating the output signals of said head to restore such signals to signals having damped ringing waveforms,
(c) means for sampling said integrated output signals at the same frequency at which said video signal was sampled and in such a way that sampling occurs at the zero crossings of a number of said restored signals, and
(d) means for structuring said video signal from said samples.

26. The apparatus of claim 19 wherein
(a) said means for sampling effects such sampling at a frequency that is twice the highest frequency within the bandwidth of said video signal, and
(b) each said means for converting an impulse signal into a damped ringing signal is a low pass filter having a cutoff frequency equal to the highest frequency in said video signal bandwidth.

27. Apparatus for playing back sampled video signal information recorded in a plurality of tracks of a magnetic recording medium in the form of damped ringing signals having the same given period of oscillation and being so recorded that the same principal peak of one signal occurs at the zero crossings of other signals, said apparatus comprising (a) a multitrack magnetic playback head responsive to the rate of change of signal flux recording in said plurality of tracks of said recording medium to produce playback signals,
(b) means for integrating said playback signals to cancel the differentiating action of said playback head,
(c) means for sampling said integrated output signals at the same frequency at which said video signal was sampled and in such a way that sampling occurs at the zero crossings of a number of said restored signals, and
(d) means for structuring said video signal from said samples.

28. Apparatus for processing simultaneously occurring impulse signals comprising
(a) a plurality of signal record channels each of which receives one of said impulse signals and includes means for converting an impulse signal into a damped ringing signal, the period of oscillation of each such damped ringing signal being the same,
(b) signal delay devices in every other signal channel, each said delay device being adapted to delay the signal processed thereby by a duration equal to the same integer multiple of said period of oscillation, said integer being a number at least equal to two, and
(c) multitrack recording means adapted to receive and record in a plurality of tracks of a recording medium said damped ringing signals, the signal in any one track of said medium having its principal peak occurring proximate the zero crossings of its neighboring signals.

29. The apparatus of claim 28 wherein said multitrack recording means is a multitrack magnetic head comprised of a succession of discrete transducers having no shields therebetween.

30. The apparatus of claim 28 including playback apparatus comprising
(a) multitrack means having a plurality of discrete transducers each of which is cooperative to reproduce one of said signals recorded in said medium,
(b) a plurality of playback signal channels adapted to receive and process the output signals of respective transducers, each said playback signal channel corresponding to a given signal record channel,
(c) means for sampling the played back signals, which were undelayed at the time of recording, at a time corresponding to their principal peaks, and for sampling the played back signals, which were delayed at the time of recording, at a time corresponding to their principal peaks, thereby to produce two differently timed sets of simultaneously occurring pulses, and
(d) signal delay means in those playback signal channels which correspond to signal record channels in which there are no signal delay devices, the playback channel delay devices providing the same signal delay as the delay devices of said signal record channels, whereby the two sets of simultaneously occurring signals are brought back into the same time frame.

31. The apparatus of claim 30 wherein said multitrack magnetic head is of the type that is responsive to flux rate of change, and wherein each playback signal channel includes, between its discrete transducer and its means for sampling, signal integrating means for nullifying the differentiating action of said magnetic head.

* * * * *